(12) United States Patent
Kang et al.

(10) Patent No.: US 8,737,207 B2
(45) Date of Patent: May 27, 2014

(54) SYSTEM AND METHOD FOR MANAGING RESOURCE IN COMMUNICATION SYSTEM

(75) Inventors: Hyunduk Kang, Gwangju (KR); Dong-Hun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 225 days.

(21) Appl. No.: 13/339,727

(22) Filed: Dec. 29, 2011

(65) Prior Publication Data

US 2012/0195270 A1  Aug. 2, 2012

(30) Foreign Application Priority Data

Dec. 29, 2010 (KR) .......................... 10-2010-0137984
Jun. 16, 2011 (KR) .......................... 10-2011-0058732

(51) Int. Cl.
*H04L 12/28* (2006.01)
*H04W 4/00* (2009.01)
*H04L 12/26* (2006.01)
*G06F 15/173* (2006.01)

(52) U.S. Cl.
USPC ........... 370/229; 370/329; 370/338; 370/400; 709/226

(58) Field of Classification Search
USPC .......... 709/223–226, 229–236; 370/229–241, 370/252, 310–350, 400–408
See application file for complete search history.

(56) References Cited

U.S. PATENT DOCUMENTS

| | | | |
|---|---|---|---|
| 7,869,400 B2 | 1/2011 | Hu et al. | |
| 8,200,161 B2 | 6/2012 | Walley et al. | |
| 8,310,991 B2 * | 11/2012 | Kasslin et al. | 370/328 |
| 8,363,602 B2 | 1/2013 | Junell et al. | |
| 8,379,586 B2 * | 2/2013 | Kasslin et al. | 370/329 |
| 8,385,286 B2 | 2/2013 | Junell et al. | |
| 8,451,789 B2 * | 5/2013 | Junell et al. | 370/329 |
| 8,514,802 B2 | 8/2013 | Junell | |
| 8,615,250 B2 | 12/2013 | Xing | |

(Continued)

FOREIGN PATENT DOCUMENTS

| | | |
|---|---|---|
| EP | 2 083 593 A2 | 7/2000 |
| KR | 1020060060452 A | 6/2006 |

(Continued)

OTHER PUBLICATIONS

Junyi Wang, et al; "Proposal for Chapter 6", IEEE 802.19 Wireless Coexistence Working Group IEEE P802.19-11/71r1; Date Submitted: Jul. 18, 2011; 51 pages.

(Continued)

*Primary Examiner* — Tri H Phan
(74) *Attorney, Agent, or Firm* — Ladas & Parry LLP

(57) ABSTRACT

A system for managing resources in a communication system including systems, which do not have a permission for a first frequency band, includes coexistence managers configured to, when a frequency band available for the systems is searched from the first frequency band, manage the systems for coexistence and frequency sharing of the systems in the available frequency band; a coexistence enabler configured to transmit and receive information of the systems and information of the coexistence managers; and a coexistence discovery and information server configured to support control of the coexistence managers over the systems, wherein the coexistence managers transmit and receive predetermined messages to and from the coexistence discovery and information server and the coexistence enabler, perform channel classification for the first frequency band, and determine operating channels of the systems on the basis of the channel classification.

20 Claims, 5 Drawing Sheets

(56) References Cited

U.S. PATENT DOCUMENTS

| | | |
|---|---|---|
| 2007/0223508 A1 | 9/2007 | Nandagopalan |
| 2008/0108366 A1 | 5/2008 | Hu |
| 2009/0059856 A1 | 3/2009 | Kermoal et al. |
| 2010/0061326 A1* | 3/2010 | Lee et al. .................. 370/329 |
| 2010/0124254 A1 | 5/2010 | Wu et al. |
| 2011/0032892 A1 | 2/2011 | Bahl et al. |
| 2011/0075586 A1 | 3/2011 | Hu et al. |
| 2011/0096770 A1 | 4/2011 | Henry |
| 2011/0116458 A1 | 5/2011 | Hsu et al. |
| 2011/0116484 A1 | 5/2011 | Henry |
| 2011/0164580 A1 | 7/2011 | Keon |
| 2011/0164581 A1 | 7/2011 | Keon |
| 2011/0286401 A1* | 11/2011 | Wijting et al. .................. 370/329 |
| 2012/0058790 A1 | 3/2012 | Junell et al. |
| 2012/0106364 A1 | 5/2012 | Kasslin et al. |
| 2012/0113906 A1* | 5/2012 | Kadous et al. .................. 370/329 |
| 2012/0115525 A1 | 5/2012 | Kang et al. |
| 2012/0117243 A1 | 5/2012 | Lee et al. |
| 2012/0195269 A1 | 8/2012 | Kang et al. |
| 2012/0201208 A1 | 8/2012 | Kang et al. |
| 2012/0201209 A1 | 8/2012 | Lee et al. |
| 2013/0051279 A1 | 2/2013 | Lee et al. |
| 2013/0155995 A1 | 6/2013 | Jo et al. |
| 2013/0155998 A1* | 6/2013 | Jo et al. .................. 370/329 |
| 2013/0157681 A1* | 6/2013 | Jo et al. .................. 455/454 |
| 2013/0157706 A1* | 6/2013 | Jo et al. .................. 455/512 |
| 2013/0165136 A1 | 6/2013 | Kang et al. |
| 2013/0165170 A1 | 6/2013 | Kang |

FOREIGN PATENT DOCUMENTS

| | | |
|---|---|---|
| KR | 1020070048171 A | 5/2007 |
| KR | 1020100053643 A2 | 7/2009 |
| KR | 1020110089262 A | 8/2011 |

OTHER PUBLICATIONS

Jihyun Lee, et al; "Coexistence Procedures and Protocols", IEEE 802.19 Wireless Coexistence Working Group IEEE P802.19-11/0009r1; Date Submitted: Jan. 17, 2011; 87 pages.

* cited by examiner

SYSTEM AND METHOD FOR MANAGING RESOURCE IN COMMUNICATION SYSTEM

CROSS-REFERENCES TO RELATED APPLICATIONS

The present application claims priority of Korean Patent Application Nos. 10-2010-0137984, 10-2011-0058732, and 10-2011-0144393, filed on Dec. 29, 2010, Jun. 16, 2011, and Dec. 28, 2011, respectively, which are incorporated herein by reference in their entirety.

BACKGROUND OF THE INVENTION

1. Field of the Invention

Exemplary embodiments of the present invention relate to a communication system, and more particularly, to a system and a method for managing resources in a communication system so as to share a plurality of frequency resources in the communication system.

2. Description of Related Art

In a current communication system, research for providing services of various qualities of service (hereinafter, referred to as 'QoSs') to users at a high transmission rate has been actively conducted. In such a communication system, research for providing large-capacity services having various QoSs using limited resources, for example, frequency resources, has been actively conducted. In particular, due to development of radio communication technologies and introduction of new wireless communication services, there is a need to efficiently use limited frequency resources.

As a method for increasing efficiency of using limited frequency resources in a communication system, there have been suggested methods for optimizing performance of the communication system, for example, methods for minimizing interference with other types of communication systems while maximizing spectral efficiency by using multiple access, encoding, modulation, information compression, etc. Also, there has been suggested a frequency sharing method for increasing frequency resource utilization efficiency by using a frequency band available from an already used frequency band such as a TV band.

Here, the frequency sharing of the frequency band available from the already used frequency band such as a TV band needs to use the available frequency band without providing interference to a primary incumbent having a preemptive permission for the TV band. Therefore, it is important to detect the available frequency band by confirming whether or not the primary incumbent uses the available frequency band in the TV band. Further, in the case where a plurality of different systems intending to use the available frequency band detected in the TV band exist, a problem is caused in terms of coexistence for using the available frequency band due to a difference in communication pattern, for example, in wireless access pattern, among the plurality of different systems.

In other words, in the current communication system, in the case where the plurality of different systems intending to use the available frequency band detected in the TV band exist as described above, a detailed method for managing resources for allowing the plurality of different systems to efficiently use the detected available frequency band is not provided. In particular, a method for efficiently using frequency resources through coexistence of the systems adopting different communication patterns so as to use the available frequency band is not provided.

Therefore, a need exists for a method for managing resources for efficiently using the detected available frequency band through coexistence of the plurality of different systems, for example, the different communication patterns of systems, after detecting the available frequency band from the already used frequency band such as a TV band in the communication system.

SUMMARY OF THE INVENTION

An embodiment of the present invention is directed to a system and a method for managing resources in a communication system.

Another embodiment of the present invention is directed to a system and a method for managing resources so as to efficiently use frequency bands among frequency bands used in advance in a communication system by coexistence of a plurality of systems.

Another embodiment of the present invention is directed to a system and a method for managing frequency resources so as to use available frequency bands in a TV band by coexistence of a plurality of systems in a communication system.

Another embodiment of the present invention is directed to a system and a method for managing frequency resources so as to use available frequency bands of a TV band by efficient coexistence and frequency sharing of a plurality of systems in the available frequency bands in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a system for managing resources in a communication system including a plurality of systems, which do not have a permission for a first frequency band, includes: a coexistence manager configured to, when a frequency band available for the plurality of systems is searched from the first frequency band, manage the plurality of systems for coexistence and frequency sharing of the plurality of systems in the available frequency band; a coexistence enabler configured to transmit and receive information of the plurality of systems and information of the coexistence manager; and a coexistence discovery and information server configured to support control of the coexistence manager over the plurality of systems, wherein a plurality of coexistence managers are provided to respectively correspond to the plurality of systems, and wherein the coexistence managers transmit and receive predetermined messages to and from the coexistence discovery and information server and the coexistence enabler, perform channel classification for the first frequency band, and determine operating channels of the plurality of systems on the basis of the channel classification.

In accordance with another embodiment of the present invention, a method for managing resources of a first frequency band in a communication system including a plurality of systems which do not have a permission for the first frequency band includes: obtaining, when a frequency band available for the plurality of systems is searched from the first frequency band, channel classification information of a plurality of coexistence managers which are configured to manage the plurality of systems in the available frequency band, from a TVWS DB which provides channel information of the available frequency band, for coexistence and frequency sharing of the plurality of systems in the available frequency band; updating channel classification of the first frequency band on the basis of the channel classification information; and determining operating channels of the plurality of systems from the channel classification of the first frequency band.

DESCRIPTION OF SPECIFIC EMBODIMENTS

Figure 1:
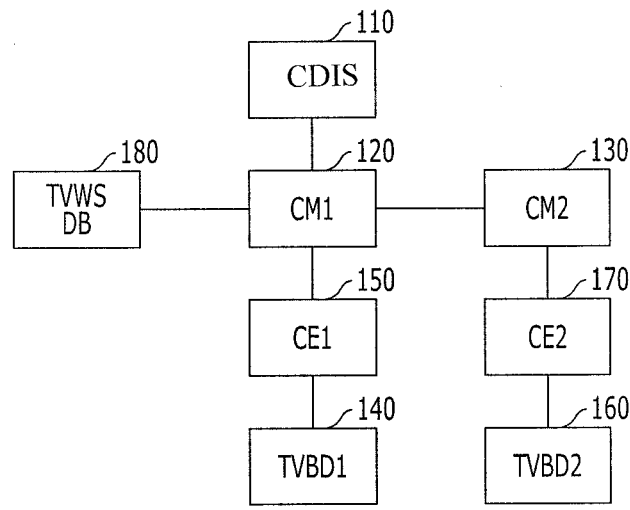
FIG. 1 is a diagram schematically showing a structure of a system for managing resources in a communication system in accordance with an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

An Embodiment of the present invention proposes a system and a method for managing resources, capable of detecting an available frequency band, for example, an idle frequency band (a white space: hereinafter, referred to as a 'WS'), from an already used frequency band such as a TV band in a communication system, for example, a cognitive radio (hereinafter, referred to as 'CR') system, an IEEE 802.19-based system or an IEEE 802.22-based system, and of effectively using the detected available frequency band. Here, while the embodiment of the present invention is described by exemplifying the CR system and the IEEE 802.19-based and IEEE 802.22-based systems, it is to be noted that the method for managing resources proposed in the embodiment of the present invention may be applied to other communication systems.

Also, the embodiment of the present invention proposes a system and a method for managing resources so as to use a frequency band available from a TV band through coexistence of a plurality of different systems in a communication system. Here, the embodiment of the present invention provides coexistence of respective objects of the system for managing resources for providing the sharing of the available frequency band in the communication system and provides coexistence of a plurality of different systems, in particular, systems using different communication patterns, for example, different wireless access patterns, so as to share the available frequency band available from the already used frequency band such as a TV band, thereby improving frequency resource utilization efficiency.

That is, the embodiment of the present invention allows the system for managing resources for the coexistence and the frequency sharing among the plurality of different systems in the communication system to share the available frequency band, thereby improving the efficiency of using limited frequency resources. Here, the embodiment of the present invention shares a frequency in the available frequency band from the already used frequency band such as a TV band. In this regard, the embodiment of the present invention need to use the available frequency band without providing interference to a primary incumbent having a preemptive permission for the TV band. To this end, the embodiment of the present invention detects the available frequency band by confirming whether the primary incumbent uses the frequency band in the TV band, and selects and uses operating channels in the detected available frequency band through the coexistence and the frequency sharing of the plurality of difference systems intending to use the available frequency band detected from the TV band. In other words, in the embodiment of the present invention, the system for managing resources for the coexistence and the frequency sharing among the plurality of different systems in the communication systems allows predetermined objects to select the operating channels in the WS for efficient coexistence. In this case, the embodiment of the present invention classifies channels available in the WS for effective selection of the operating channels in the WS and allocates the classified channels.

Here, in order for efficient coexistence and frequency sharing among the plurality of different systems in the band available from the TV band, that is, in a TVWS, the system for managing resources performs message transmission and reception procedures. In other words, in order for efficient coexistence and frequency sharing of the plurality of different systems which use the TVWS, the system for managing resources transmits and receives messages among the respective objects of the system for managing resources. In particular, the system for managing resources transmits and receives messages regarding registration, coexistence information gathering, coexistence decision making, reconfiguration, management and an event, thereby improving efficiencies of the coexistence and frequency sharing of the plurality of different systems in the TVWS.

That is to say, in order for the efficient coexistence and frequency sharing of the plurality of different systems in the TVWS, in the system for managing resources according to the embodiment of the present invention, a registration procedure and a message in the registration procedure are defined, and a coexistence information gathering procedure and a message in the coexistence information gathering procedure are defined. Further, in the system for managing resources, a coexistence decision making procedure and a message in the coexistence decision making procedure are defined, a reconfiguration procedure and a message in the reconfiguration procedure are defined, a management procedure and a message in the management procedure are defined, and an event procedure and a message in the event procedure are defined. Namely, in order for the efficient coexistence and frequency sharing of the plurality of different systems in the TVWS, the messages defined in this way are transmitted and received among the respective objects of the system for managing resources, and the defined procedures are performed, thereby improving the efficiencies of the coexistence and frequency sharing of the plurality of different systems in the TVWS. Here, the system for managing resources in a communication system in accordance with the embodiments of the present invention will be described in more detail with reference to FIG. 1.

FIG. 1 is a diagram schematically illustrating a structure of a system for managing resources in a communication system in accordance with an embodiment of the present invention.

Referring to FIG. 1, when a plurality of different systems intend to use a frequency band available from an already used frequency band such as a TV band, that is, a TVWS, the system for managing resources includes sharing devices intending to use the available frequency band through frequency sharing among the plurality of different systems, for example, a TV band device 1 (hereinafter, referred to as 'TVBD1') 140 and a TVBD2 160, coexistence managers (hereinafter, referred to as 'CMs') managing the TVBDs 140 and 160 for improving frequency sharing efficiency between the TVBDs 140 and 160, for example, a CM1 120 and a CM2 130, coexistence enablers (hereinafter, referred to as 'CEs') included in the TVBDs 140 and 160 or independently located to serve as passages between the TVBDs 140 and 160 and the CMs 120 and 130, for example, a CE1 150 and a CE2 170, a server supporting control of the TVBDs 140 and 160 by the CMs 120 and 130, for example, a coexistence discovery and information server (hereinafter, referred to as 'CDIS'), and a TVWS data base 180 (hereinafter, referred to as 'TVWS DB') providing channel information for the band available from the TV band, that is, the TVWS. Here, the system for managing resources includes the CEs, the CMs, the CDIS and the TVWS DB as objects for coexistence and frequency sharing of the plurality of systems, that is, the TVBDs, in the TVWS.

The TVBDs 140 and 160 mean devices of the plurality of different systems, that is, secondary systems, allowing other users (hereinafter, referred to as the 'secondary systems') who do not have a preemptive permission for the TV band, to detect and use a predetermined frequency band as the available frequency band from the TV band, when a primary incumbent (hereinafter, referred to as a 'primary system') having the preemptive permission for the TV band does not use the predetermined frequency band in the TV band as aforementioned above. Here, the TVBDs 140 and 160 share and use the predetermined frequency band through the coexistence and the frequency sharing so as to efficiently use limited frequency resources. That is, the TVBDs 140 and 160 are allocated with channels from the TVWS, and transmit and receive data.

The CEs 150 and 170 are independently located in the TVBDs 140 and 160 as described above, and transmit and receive the information of the TVBDs 140 and 160 and the information of the CMs 120 and 130. Here, while it is mainly described in the embodiment of the present invention for the sake of convenience in explanation that the CEs 150 and 170 independently exist in the TVBDs 140 and 160, it is to be noted that the CEs 150 and 170 may be included in the TVBDs 140 and 160 or the CMs 120 and 130.

In addition, the CEs 150 and 170 extract context information associated with the corresponding TVBDs 140 and 160, requested by the respective CMs 120 and 130, for example, information such as a wireless access pattern, transmission power, a spectral sensing threshold value, a position and so forth of the TVBDs 140 and 160, from the TVBDs 140 and 160, and transmit the extracted context information to the CMs 120 and 130. That is to say, the CEs 150 and 170 acquire the communication-related information of respective systems as the context information on different secondary systems, and transmit the acquired information to the CMs 120 and 130.

Further, the CEs 150 and 170 receive requests from the CMs 120 and 130 for management of the TVBDs 140 and 160, for example, requests for the context information and the configurations of the TVBDs 140 and 160, and in response to the requests, update the context information of the TVBDs 140 and 160 and reset, that is, reconfigure the configurations of the TVBDs 140 and 160. In other words, the CEs 150 and 170 receive changed information of the context information, that is, event information of the TVBDs 140 and 160, as the requests for the context information of the TVBDs 140 and 160, and update the context information of the TVBDs 140 and 160 according to the event information. Moreover, the CEs 150 and 170 receive resetting of the components of the TVBDs 140 and 160 as the requests for the configurations of the TVBDs 140 and 160, and reset, that is, reconfigure the components of the TVBDs 140 and 160 according to the resetting of the components.

The CMs 120 and 130 determine operation frequency allocation, transmission power allocation, transmission time allocation, and so forth, so as to improve the frequency sharing efficiency between the TVBDs 140 and 160. In other words, the CMs 120 and 130 perform the operation frequency allocation, the transmission power allocation, and the transmission time allocation for the TVBDs 140 and 160 in the available frequency band so as to improve the frequency sharing efficiency between the TVBDs 140 and 160 for the available frequency band in the above-described TV band.

Here, the CMs 120 and 130 perform the operation frequency allocation, the transmission power allocation, and the transmission time allocation for the corresponding TVBDs in the available frequency band by transmitting and receiving information, for example, the context information and the event information of the TVBDs, to and from the CMs, for example, neighbor CMs, of the TVBDs that do not correspond to the CMs 120 and 130, so as to more improve the frequency sharing efficiency between the TVBDs 140 and 160. In this case, the CMs 120 and 130 acquire the context information and the event information of the TVBDs that do not correspond to the CMs 120 and 130, through direct transmission and reception to and from other CMs (for example, neighbor CMs) or transmission and reception via the CDIS 110 to and from other CMs. Further, the CMs 120 and 130 acquire information on the use of a spectrum in the primary system, that is, channel information on channels available in the TV band, through an external data base, for example, the TVWS DB 180, or request resetting of the components the TVBDs corresponding to the CMs 120 and 130, to other CMs.

As described above, the CDIS 110 supports the control operation of the CMs 120 and 130 for frequency sharing of the TVBDs 140 and 160 for the available frequency band in the TV band. Namely, the CDIS 110 receives and stores the context information and the event information of the TVBDs 140 and 160 from the CMs 120 and 130, and transmits the context information and the event information of the TVBDs 140 and 160 to the CMs 120 and 130 according to requests from the CMs 120 and 130. Furthermore, the CDIS 110 acquires and stores the information on the use of a spectrum in the primary system, that is, the channel information on channels available in the TV band, through the external data base, for example, the TVWS DB 180.

The TVWS DB 180 provides channel information on channels available in the TVWS, that is, shared channel information, to the CMs 120 and 130. The channel information is provided only to the TVBDs that are registered in the TVWS DB 180 and have authorized identification numbers.

The system for managing resources in a communication system in accordance with the embodiment of the present invention includes the TVWS DB 180, the CDIS 110, the CMs 120 and 130, and the CEs 140 and 160, so as to allow the secondary systems to share and use the frequency band available from the frequency band already used by the primary system, such as the TV band, that is, so as to allow coexistence and frequency sharing of the TVBDs 140 and 160. Here, the TVBDs 140 and 160 as devices of the secondary systems for sharing and using the available frequency band as described above may include a base station (hereinafter, referred to as 'BS'), an access point (hereinafter, referred to as 'AP'), a service access point (hereinafter, referred to as 'SAP'), a terminal, or the like. Also, the secondary systems as the plurality of different systems for sharing the available frequency band as described above may include different communication patterns of systems, for example, an IEEE 802.19-based system, an IEEE 802.22-based system, or the like.

Besides, the system for managing resources in a communication system in accordance with the embodiment of the present invention transmits and receives predetermined messages so as to provide the coexistence and the frequency sharing of the TVBDs 140 and 160 for the frequency band available in the already used frequency band, in particular, so as to provide the efficient coexistence and frequency sharing of the plurality of systems, for example, the TVBDs 140 and 160, in the TVWS as described above, so that frequency utilization efficiency may be improved through the effective coexistence and frequency sharing of the plurality of systems in the TVWS.

The system for managing resources operates in a management mode and an autonomous mode (or an information mode). In the management mode, the system for managing resources reflects the frequency sharing devices indicated by the CMs, that is, the setting of the TVBDs and the resetting of the configurations of the TVBDs, on the TVBDs. In the autonomous mode, the system for managing resources makes by itself a decision on the coexistence and frequency sharing, on the basis of the information regarding the coexistence and frequency sharing, which is received by the CEs from the CMs. The decision made on the coexistence and frequency sharing is reflected on the TVBDs on which the setting of the TVBDs and the resetting of the configurations of the TVBDs are reflected. Also, the system for managing resources operates in a centralized topology and a distributed topology. In the centralized topology, among a plurality of CMs, a plurality of slave CMs are connected to one optional master CM. The slave CMs are controlled by the master CM for coexistence and frequency sharing among TVBDs. In the distributed topology, coexistence and frequency sharing among the TVBDs are implemented through negotiation between one optional CM and neighbor CMs of the one CM among a plurality of CMs. Hereafter, classification of channels available in a TVWS in order for coexistence and frequency sharing among TVBDs in the TVWS, in the system for managing resources in a communication system in accordance with the embodiment of the present invention, will be described in detail with reference to FIG. 2.

Figure 2:
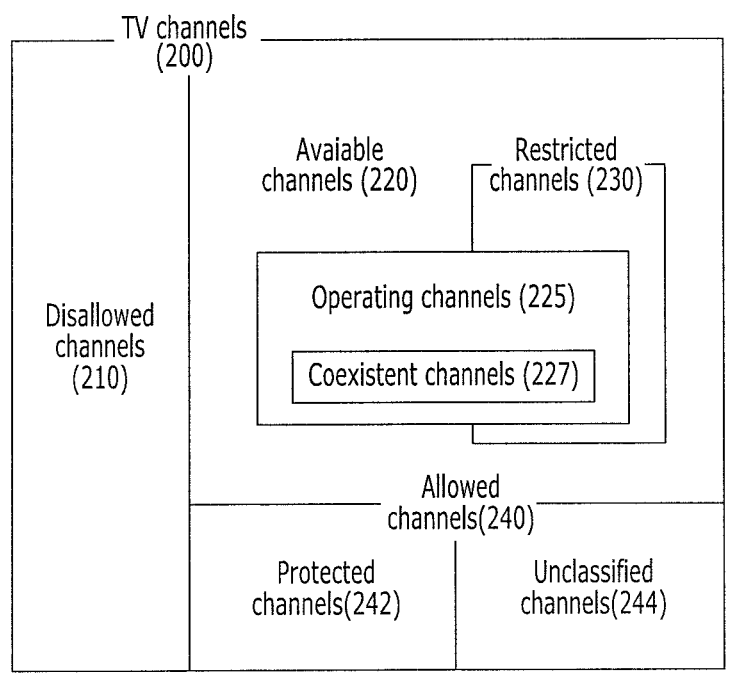
FIG. 2 is a diagram explaining channel classification of the system for managing resources in a communication system in accordance with the exemplary embodiment of the present invention.

FIG. 2 is a diagram explaining channel classification of the system for managing resources in a communication system in accordance with the exemplary embodiment of the present invention. Here, since channel allocation of the system for managing resources is determined according to the types of the TVBDs in the TVWS and whether or not channels are used in neighbor CMs, classification of channels in the TVWS with respect to a TV band is performed as shown in FIG. 2 for effective coexistence and frequency sharing.

Referring to FIG. 2, the CM of the system for managing resources acquires information on channels available in the TV band, that is, the channel information of the TVWS, from the TVWS DB, and classifies, based on the channel information, TV channels 200 of the TV band for which the plurality of systems have no permissions, into disallowed channels 210, available channels 220, restricted channels 230, allowed channels 240, operating channels 225, coexistent channels 227, protected channels 242, and unclassified channels 244. This channel classification of the TV channels 200 by the CM is given by way of example only, and the TV channels 200 may be classified in a variety of ways according to the coexistence and frequency sharing of the plurality of systems in the TVWS.

The operating channels 225 mean a set of sub frequency resources allocated to one system sharing the TV channels 200 through coexistence and frequency sharing, that is, a TVBD, or a plurality of systems using the same wireless access pattern, that is, TVBDs. The sub frequency resources may be represented by channels as a partial frequency band in the entire frequency band which can be used by a primary incumbent system, that is, a main system. Also, the operating channels 225 are allocated from the available channels 220 and the restricted channels 230 of the TV channels 200.

The coexistent channels 227 mean a set of sub frequency resources allocated to at least two systems using the same wireless access pattern or different wireless access patterns, that is, TVBDs, among the TV channels 200, and are allocated from the operating channels 225 of the TV channels 200.

The available channels 220 mean a set of sub frequency resources capable of being allocated to at least one system, that is, a TVBD, through coexistence and frequency sharing among the TV channels 200, by not being used regionally or in time by the primary incumbent system, that is, the main system, and satisfying channel quality no lower than a predefined level. That is to say, the available channels 220 mean channels which can be used among the TV channels by the plurality of systems, that is, TVBDs, through coexistence and frequency sharing, and are allocated from the TV channels 200.

The protected channels 242 mean a set of sub frequency resources which are used by the primary incumbent system, that is, the main system, among the TV channels 200 and cannot be allocated to the plurality of systems, that is, TVBDs, that is, channels which cannot be used by the plurality of systems.

The restricted channels 230, that is, conditionally available channels, mean a set of sub frequency resources which can be limitedly allocated to the plurality of systems according to regulations associated with frequency bands, among the TV channels 200. For example, sub frequency resources of which neighbor sub frequency resources are used by the main system and which can be limitedly allocated to the plurality of systems through coexistence and frequency sharing are included in the restricted channels 230. Here, neighbor sub frequency resources of an $F^{th}$ sub frequency resource are defined as $F\pm1^{th}$ sub frequency resources or $F\pm2^{th}$ sub frequency resources. The sub frequency resources included in the restricted channels 230 mean frequency resources which are not allocated to the plurality of systems, that is, TVBDs. Further, the sub frequency resources of the restricted channels 230 use a low power level that is clearly distinguished from a power level used by the main system in the neighbor sub frequency resources of a corresponding frequency band, such that the corresponding frequency band can be limitedly allocated to the plurality of systems.

The disallowed channels 210 mean a set of sub frequency resources of which use by the plurality of systems is inhibited by the regulations associated with frequency bands among the TV channels 200, that is, sub frequency resources of which allocation to the plurality of systems is inhibited.

The unclassified channels 244 mean a set of sub frequency resources which do not belong to the channel classification into the operating channels 225, the coexistent channels 227, the available channels 220, the restricted channels 230, the protected channels 242 and the disallowed channels 210 among the TV channels 200. That is to say, the unclassified channels 244 mean a set of sub frequency resources of which states are not identified among the TV channels 200.

The CM of the frequency management system in accordance with the embodiment of the present invention classifies the TV channels 200 in this way. For such channel classification, the CM transmits and receives messages to and from the TVWS DB, the CDIS, the neighbor CMs, and the CEs and TVBDs registered in it. Hereafter, channel classification of the system for managing resources in a communication system in accordance with the exemplary embodiment of the present invention will be described in detail with reference to FIGS. 3 to 9.

Figure 3:
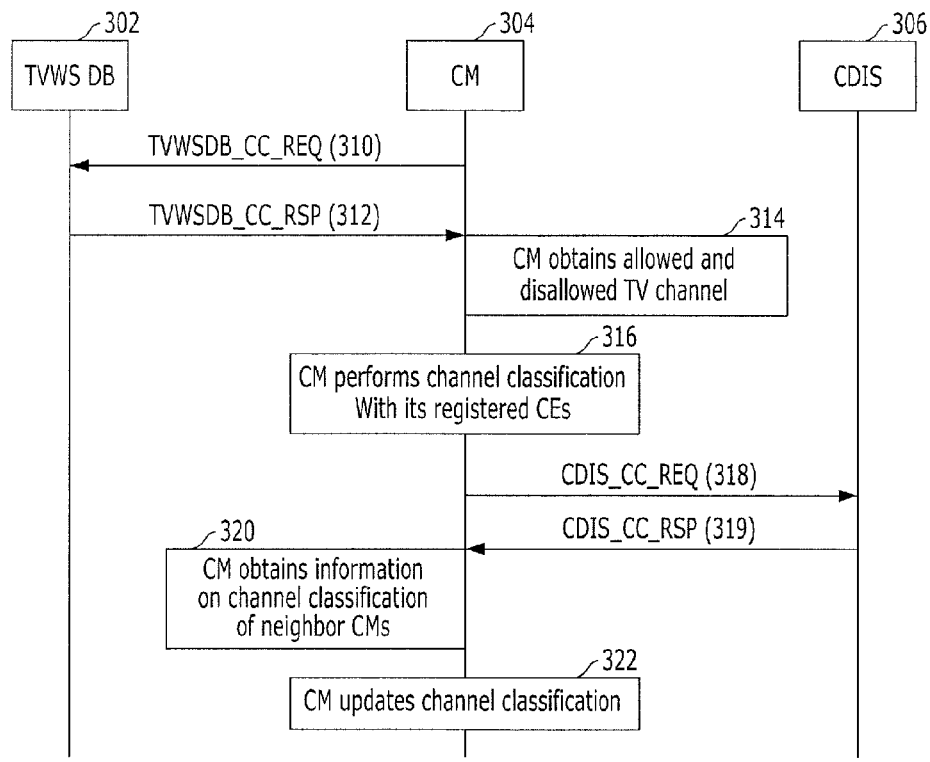
FIGS. 3 to 8 are diagrams schematically showing a channel classification procedure of the system for managing resources in a communication system in accordance with the exemplary embodiment of the present invention.

FIG. 3 is a diagram schematically showing a channel classification procedure of the system for managing resources in a communication system in accordance with the exemplary embodiment of the present invention. FIG. 3 is a diagram schematically showing a channel classification procedure by the CM of the system for managing resources in a communication system in accordance with the exemplary embodiment of the present invention.

Referring to FIG. 3, in order for channel classification for coexistence and frequency sharing in the TVWS, a CM 304 requests channel information to a TVWS DB 302 having channel information of the TVWS or to a CE registered in the CM 304 itself. Hereafter, for the sake of convenience in explanation, the case in which the CM 304 requests the channel information to the TVWS DB 302 will be mainly described. In this regard, in the case where the CM 304 requests the channel information to the registered CE, operations are performed in the same manner as in the case where the CM 304 requests the channel information to the TVWS DB 302, and therefore, detailed descriptions thereof will be omitted herein.

The CM 304 transmits a TVWS DB channel classification request (hereinafter, referred to as 'TVWSDB_CC_REQ') message which requests the channel information stored in the TVWS DB 302, for example, an allowed channel list in the TVWS, to the TVWS DB 302 (step 310).

Here, the TVWSDB_CC_REQ message is a message which requests the allowed channel list in the TVWS to the TVWS DB 302 for channel classification in the TVWS. The TVWSDB_CC_REQ message is used in the same manner in the centralized topology, the distributed topology and the autonomous mode of the system for managing resources. Further, the TVWSDB_CC_REQ message is used not only when the CM 304 requests the allowed channel list in the TVWS to the TVWS DB 302 but also when the CM 304 requests the allowed channel list in the TVWS to a CE (not shown). The contents of the TVWSDB_CC_REQ message, that is, the header and payload of the TVWSDB_CC_REQ message may be presented as in Table 1.

TABLE 1

| Name | Data Type | Description |
|---|---|---|
| Header | | |
| SourceID | CM ID | Source identifier |

TABLE 1-continued

| Name | Data Type | Description |
|---|---|---|
| DestinationID | TVWS DB ID/CE ID | Destination identifier |
| Payload | | |
| TVWSDBInformationIDs | COEX_TVWSDB_INFO_IDS | TVWS DB information IDs Allowed TVWS channel list Channel use constraint |

Also, the CM 304 receives a TVWS DB channel classification response (hereinafter, referred to as 'TVWSDB_CC_RSP') message which includes the channel information stored in the TVWS DB 302, for example, the allowed channel list in the TVWS, from the TVWS DB 302 as a response to the TVWSDB_CC_REQ message (step 312).

Here, the TVWSDB_CC_RSP message as a response message of the TVWSDB_CC_REQ message, which requests the channel information in the TVWS, for example, the allowed channel list in the TVWS, is a message which is provided to the CM 304 by the TVWS DB 302 or the CE as the channel information in the TVWS, for example, the allowed channel list in the TVWS, for channel classification in the TVWS. The TVWSDB_CC_RSP message is used in the same manner in the centralized topology, the distributed topology and the autonomous mode of the system for managing resources. The contents of the TVWSDB_CC_RSP message, that is, the header and payload of the TVWSDB_CC_RSP message may be presented as in Table 2.

TABLE 2

| Name | Data Type | Description |
|---|---|---|
| Header | | |
| SourceID | TVWS DB ID/CE ID | Source identifier |
| DestinationID | CM ID | Destination identifier |
| Payload | | |
| NeighborCETVWSDBChList | COEX_TVBD_TVWS | TVBD TVWS DB channel list, including Allowed TVWS channel list Channel use constraint |

The CM 304, which has received the channel information in the TVWS, for example, the allowed channel list in the TVWS, from the TVWS DB 302 or the CE in this way, obtains allowed and disallowed channels in the TVWS (step 314). The CM 304 classifies the TVWS into allowed channels and disallowed channels. At this time, the CM 304 classifies the TVWS into allowed channels and disallowed channels for all CEs registered in the CM 304 itself (step 316).

Next, the CM 304 requests channel classification information of neighbor CMs to a CDIS 306 which has the channel classification information of the neighbor CMs neighboring to the CM 304 in the TVWS. In other words, the CM 304 transmits a CDIS channel classification request (hereinafter, referred to as 'CDIS_CC_REQ') message which requests the channel classification information of the neighbor CMs stored in the CDIS 306, to the CDIS 306 (step 318).

Here, the CDIS_CC_REQ message is a message which requests the channel classification information of the neighbor CMs in the TVWS to the CDIS 306 for channel classification in the TVWS. The CDIS_CC_REQ message is used in the same manner in the centralized topology, the distributed topology and the autonomous mode of the system for managing resources. The contents of the CDIS_CC_REQ message, that is, the header and payload of the CDIS_CC_REQ message may be presented as in Table 3.

TABLE 3

| Name | Data Type | Description |
|---|---|---|
| Header | | |
| SourceID | CM ID | Source identifier |
| DestinationID | CDIS ID | Destination identifier |
| Payload | | |
| NeighborCMID | STRING | Neighbor CM ID |
| NeighborCEIDList | SEQUENCE OF STRING | Neighbor CE ID list |

Further, the CM 304 receives a CDIS channel classification response (hereinafter, referred to as 'CDIS_CC_RSP') message which includes the channel classification information of the neighbor CMs in the TVWS stored in the CDIS 306, from the CDIS 306 as a response to the CDIS_CC_REQ message (step 319).

Here, the CDIS_CC_RSP message as a response message of the CDIS_CC_REQ message, which requests the channel classification information of the neighbor CMs in the TVWS by channel classification of the neighbor CMs in the TVWS, is a message through which the CDIS 306 provides the channel classification information of the neighbor CMs to the CM 304. The CDIS_CC_RSP message is used in the same manner in the centralized topology, the distributed topology and the autonomous mode of the system for managing resources. The contents of the CDIS_CC_RSP message, that is, the header and payload of the CDIS_CC_RSP message may be presented as in Table 4.

The CM 304, which has received the CDIS_CC_RSP message including the channel classification information of the neighbor CMs in the TVWS from the CDIS 306 in this way, obtains the channel classification information of the neighbor CMs in the TVWS (step 320). Then, the CM 304 updates the allowed channels and the disallowed channels classified in the TVWS by using the channel classification information of the neighbor CMs in the TVWS, that is, updates channel classification in the TVWS (step 322). Hereafter, another exemplary embodiment of channel classification of the system for managing resources in a communication system in accordance with the exemplary embodiment of the present invention will be described in detail with reference to FIG. 4.

Figure 4:
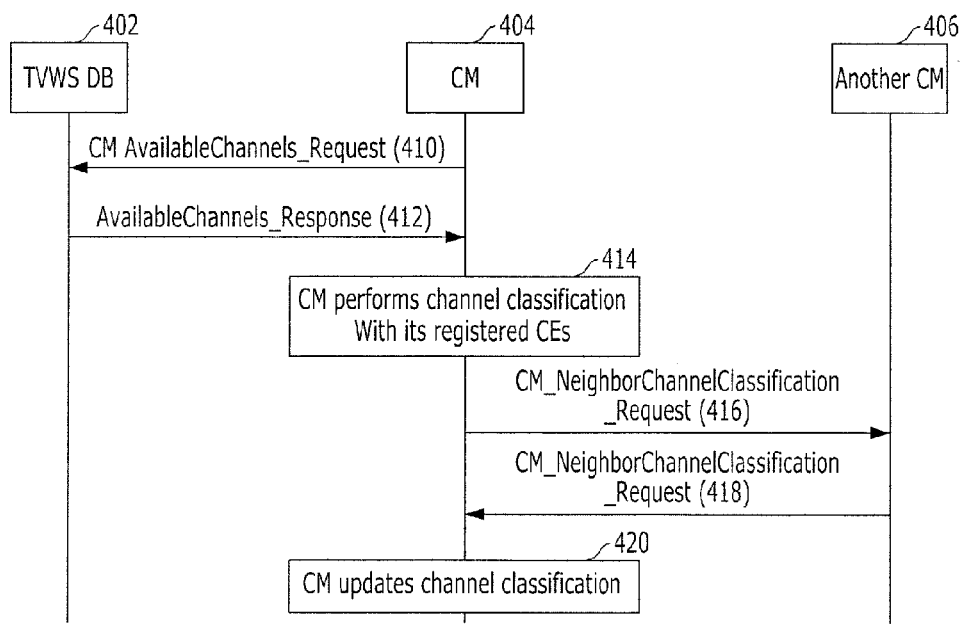

FIG. 4 is a diagram schematically showing another exemplary channel classification procedure of the system for managing resources in a communication system in accordance with the exemplary embodiment of the present invention. FIG. 4 is a diagram schematically showing another exemplary channel classification procedure by the CM of the system for managing resources in a communication system in accordance with the exemplary embodiment of the present invention.

Referring to FIG. 4, in order for channel classification for coexistence and frequency sharing in the TVWS, a CM 404 requests channel information of the TVWS to a TVWS DB 402 which has the channel information of the TVWS. That is to say, the CM 404 transmits a CM available channel request (hereinafter, referred to as 'CM_AvailableChannels_Request') message which requests channel information stored in the TVWS DB 402, for example, an available channel list of the CM 404 in the TVWS, to the TVWS DB 402 (step 410).

Here, the CM_AvailableChannels_Request message is a message which requests a list of channels available for the CM 404 in the TVWS for channel classification in the TVWS, to the TVWS DB 402. The contents of the CM_AvailableChannels_Request message, that is, the header and payload of the CM_AvailableChannels_Request message may be presented as in Table 5, and the data type of the CM_AvailableChannels_Request message may be presented as in Table 6.

TABLE 5

| Information element | Data type | Description |
|---|---|---|
| Header | | |
| sourceIdentifier = CM_ID | CX_ID | Source identifier |

TABLE 4

| Name | Data Type | Description |
|---|---|---|
| Header | | |
| SourceID | CDIS ID | Source identifier |
| DestinationID | CM ID | Destination identifier |
| Payload | | |
| NeighborCMID | SEQUENCE | Neighbor CM ID |
| NeighborCEIDList | SEQUENCE OF STRING | Neighbor CE ID list |
| The message contents below are repeated for each neighbor CE | | |
| NeighborCEID | STRING | Neighbor CE ID |
| NeighborCEChannelClassificationList | COEX_CH_CLASSIFICATION | Channel classification of neighbor CE |

TABLE 5-continued

| Information element | Data type | Description |
|---|---|---|
| destinationIdentifier = TVWSDB_ID | CX_ID | Destination identifier |
| ACKPolicy | BOOLEAN | Request to send an acknowledgement of reception |
| Payload | | |
| requestedTimeStamp | TIME | Time of the request |
| deviceFCCID | | FCC ID of the TVBD network or device |
| deviceSN | | Serial number of the TVBD network or device |
| deviceLocation | DeviceLocation | Location of the TVBD network or device |

CM 402 in the TVWS, from the TVWS DB 402 as a response to the CM_AvailableChannels_Request message (step 412).

Here, the AvailableChannels_Response message as a response message of the CM_AvailableChannels_Request message, which requests the list of the channels available for the CM 404 in the TVWS, is a message through which the TVWS DB 402 provides the available channel information of the CM 404 in the TVWS, that is, the available channel list, to the CM 404, for the channel classification in the TVWS. The contents of the AvailableChannels_Response message message, that is, the header and payload of the AvailableChannels_Response message may be presented as in Table 7, and the data type of the AvailableChannels_Response message may be presented as in Table 8.

TABLE 7

| Information element | Data type | Description |
|---|---|---|
| Header | | |
| sourceIdentifier = TVWSDB_ID | CX_ID | Source identifier |
| destinationIdentifier = CM_ID | CX_ID | Destination identifier |
| ACKPolicy | BOOLEAN | Request to send an acknowledgement of reception |
| Payload | | |
| listOfAllowedTVWSChNumber | ListOfAllowedTVWSChNumber OPTIONAL | Allowed TVWS channel number list |
| constOfChUses | ConstOfChUses OPTIONAL | Channel user constraint |
| Note: Information elements below are repeated for each available frequency. | | |
| startFreq | REAL OPTIONAL | Start frequency |
| stopFreq | REAL OPTIONAL | Stop frequency |
| txPowerLimit | REAL OPTIONAL | Transmit power limit |
| aggregatedInterferenceControlParameters | AggregatedInterferenceControlParameters | Aggregated interference control parameters |

TABLE 5-continued

| Information element | Data type | Description |
|---|---|---|
| antennaHeight | REAL | Antenna height of the TVBD network or device |
| networkType | NetworkType | E.g., fixed mode 2 |
| ... | | |

TABLE 6

```
CX_ID ::= ENUMERATED{
    CE_ID,
    CM_ID,
    CDIS_ID,
    TVWSDB_ID
}
DeviceLocation ::= SEQUENCE{
    coordinateX    REAL,
    coordinateY    REAL,
    coordinateZ    REAL
}
NetworkType ::= ENUMERATED{
    fixed,
    mode2,
    ...
}
```

Further, the CM 404 receives an available channel response (hereinafter, referred to as 'AvailableChannels_Response') message which includes the channel information stored in the TVWS DB 402, for example, the available channel list of the

TABLE 8

```
ListOfAllowedTVWSChNumber ::= SEQUENCE OF INTEGER
ConstOfChUseID :: = ENUMERATED{
    regulationMaxTxPower,
    regulationMaxAntGain,
    regulationMaxAntHeight,
    regulationTVDBUpdateTime,
    OutOfBandEmissionLimit,
    ...
}
ConstOfChUseValue :: = CHOICE{
    regulationMaxTxPower           REAL,
    regulationMaxAntMaxGain    REAL,
    regulationAntMaxHeight         REAL,
    regulationTVDBUpdateTime    REAL,
OutOfBandEmissionLimit         REAL,
    ...
}
ConstOfChUse : : = SEQUENCE{
constOfChUseID            ConstOfChUseID,
constOfChUseValue         ConstOfChUseValue
}
ConstOfChUses : : = SEQUENCE OF ConstOfChUse
AggregatedInterferenceControlParameters :: = SEQUENCE{
ReferencePointID          INTEGER,
Geolocation               ReferencePointGeolocation,
ACS                       REAL,
Antenna height            REAL,
Antenna gain              REAL,
Protection ratio                     REAL,
    ...
}
ReferencePointGeolocation :: = ENUMERATED {
Latitude                  REAL,
```

TABLE 8-continued

| | |
|---|---|
| Longitude | REAL, |
| Altitude | REAL, |
| ... | |
| } | |

The CM 404, which has received the AvailableChannels_Response message including the information of the channels available in the TVWS, for example, the available channel list of the CM 404 in the TVWS, from the TVWS DB 402 in this way, performs channel classification in the TVWS for all CEs registered in the CM 404 itself, by using the available channel information in the TVWS (step 414).

Next, the CM 404 requests, to an optional neighbor CM 406 which has channel classification information of CMs neighboring to the CM 404 itself in the TVWS, channel classification information of the neighbor CM 406 itself. Namely, the CM 404 transmits a CM neighbor channel classification request (hereinafter, referred to as 'CM_NeighborChannelClassification_Request') message which requests the channel classification information of the neighbor CM 406, to the neighbor CM 406 (step 416).

Here, the CM_NeighborChannelClassification_Request message is a message which requests the channel classification information of the neighbor CM 406 in the TVWS, to the neighbor CM 406 for the channel classification in the TVWS. The contents of the CM_NeighborChannelClassification_Request message, that is, the header and payload of the CM_NeighborChannelClassification_Request message may be presented as in Table 9, and the data type of the CM_NeighborChannelClassification_Request message may be presented as in Table 10.

TABLE 9

| Information element | Data type | Description |
|---|---|---|
| Header | | |
| sourceIdentifier = CM_ID | CX_ID | Source identifier |
| destinationIdentifier = CDIS_ID | CX_ID | Destination identifier |
| ACKPolicy | BOOLEAN | Request to send an acknowledgement of reception |
| Payload | | |
| neighborCMID | CX_ID | Neighbor CM ID |
| listOfNeighborCEID | ListOfNeighborCEID | Neighbor CE ID list |

TABLE 10

| |
|---|
| ListOfNeighborCEID ::= SEQUENCE OF CX_ID |

Further, the CM 404 receives a CM neighbor channel classification response (hereinafter, referred to as 'CM_NeighborChannelClassification_Response') message which includes the channel classification information of the neighbor CM 406, from the neighbor CM 406 as a message to the CM_NeighborChannelClassification_Request message (step 418).

Here, CM_NeighborChannelClassification_Response message as a response message of the CM_NeighborChannelClassification_Request message, which requests the channel classification information of the neighbor CM 406 in the TVWS by channel classification of the neighbor CM in the TVWS, is a message through which the neighbor CM 406 provides the channel classification information of the CM 406 itself in the TVWS, to the CM 404. The contents of the CM_NeighborChannelClassification_Response message, that is, the header and payload of the CM_NeighborChannelClassification_message may be presented as in Table 11, and the data type of the CM_NeighborChannelClassification_Response message may be presented as in Table 12.

TABLE 11

| Information element | Data type | Description |
|---|---|---|
| Header | | |
| sourceIdentifier = CDIS_ID | CX_ID | Source identifier |
| destinationIdentifier = CM_ID | CX_ID | Destination identifier |
| ACKPolicy | BOOLEAN | Request to send an acknowledgement of reception |
| Payload | | |
| neighborCMID | CX_ID | Neighbor CM ID |
| Note: Information elements below are repeated for each neighbor TVBD network or device. | | |
| neighborCEID | CX_ID | Neighbor CE ID |
| chClassInfo | ChClassInfo | Channel classification information of neighbor CE |

TABLE 12

```
OperatingChannelInfo :: = SEQUENCE {
    operatingChannelNumber    INTEGER,
    listOfNetworkID    SEQUENCE OF NetworkID,
    ...
}
ChClassInfo :: = SEQUENCE {
    availableChannelList    SEQUENCE OF INTEGER,
    restrictedChannelList    SEQUENCE OF INTEGER,
    protectedChannelList    SEQUENCE OF INTEGER,
    unclassifiedChannelList    SEQUENCE OF INTEGER,
    operatingChannelList    SEQUENCE OF OperatingChannelInfo,
    coexistenceChannelList    SEQUENCE OF OperatingChannelInfo,
    ...
}
NetworkID::= ENUMERATED{
    BSSID,
    ...
}
```

The CM 404, which has received the CM_NeighborChannelClassification_message including the channel classification information of the neighbor CM 406 in the TVWS from the neighbor CM 406 in this way, updates channel classification in the TVWS by using the channel classification information of the neighbor CM 406 in the TVWS (step 420). Hereafter, another exemplary embodiment of channel classification of the system for managing resources in a communication system in accordance with the exemplary embodiment of the present invention will be described in detail with reference to FIG. 5.

Figure 5:
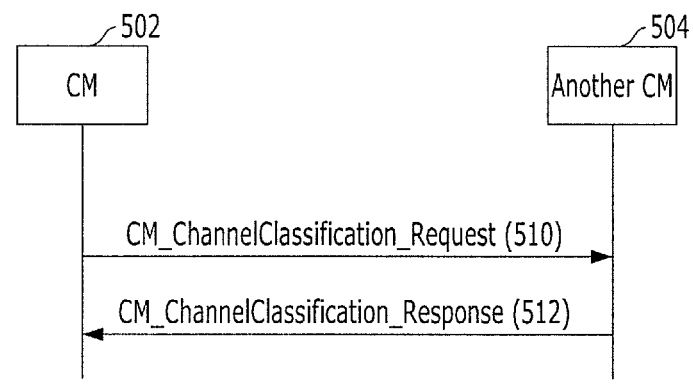

FIG. 5 is a diagram schematically showing another exemplary channel classification procedure of the system for managing resources in a communication system in accordance with the exemplary embodiment of the present invention. FIG. 5 is a diagram schematically showing another exemplary channel classification procedure by the CM of the system for managing resources in a communication system in accordance with the exemplary embodiment of the present invention.

Referring to FIG. 5, in order for channel classification for coexistence and frequency sharing in the TVWS, a CM 502 requests, to another optional CM 504 in the TVWS, channel classification information of another CM 504 itself. That is to say, the CM 502 transmits a CM channel classification request (hereinafter, referred to as 'CM_ChannelClassification_Request') message which requests the channel classification information of another CM 504, to another CM 504 (step 510).

Here, the CM_ChannelClassification_Request message is a message which requests the channel classification information of another CM 504 in the TVWS, to another CM 504 for the channel classification in the TVWS. The contents of the CM_ChannelClassification_Request message, that is, the header and payload of the CM_ChannelClassification_Request message may be presented as in Table 13.

TABLE 13

| Information element | Data type | Description |
|---|---|---|
| Header | | |
| sourceIdentifier = CM_ID | CX_ID | Source identifier |
| destinationIdentifier = CM_ID | CX_ID | Destination identifier |
| ACKPolicy | BOOLEAN | Request to send an acknowledgement of reception |
| Payload | | |
| listOfNetworkID | SEQUENCE OF NetworkID | Neighbor network ID list |

Also, the CM 502 receives a CM channel classification response (hereinafter, referred to as 'CM_ChannelClassification_Response') message which includes the channel classification information of another CM 504, from another CM 504 as a response to the CM_ChannelClassification_Request message (step 512).

The CM_ChannelClassification_Response message as a response message of the CM_ChannelClassification_Request message, which requests the channel classification information of another CM 504 in the TVWS by channel classification of another CM 504 in the TVWS, is a message through which another CM 504 provides the channel classification information of another CM 504 itself in the TVWS, to the CM 502. The contents of the CM_ChannelClassification_Response message, that is, the header and payload of the CM_ChannelClassification_Response message may be presented as in Table 14.

TABLE 14

| Information element | Data type | Description |
|---|---|---|
| Header | | |
| sourceIdentifier = CM_ID | CX_ID | Source identifier |
| destinationIdentifier = CM_ID | CX_ID | Destination identifier |
| ACKPolicy | BOOLEAN | Request to send an acknowledgement of reception |
| Payload | | |
| Note: Information elements below are repeated for each neighbor TVBD network or device. | | |
| networkID | NetworkID | Neighbor network ID |
| chClassInfo | ChClassInfo | Channel classification information of neighbor CE |

The CM 502, which has received the CM_ChannelClassification_Response message including the channel classification information of another CM 504, from another CM 504 in this way, performs channel classification in the TVWS and channel classification update by using the channel classification information of another CM 504 in the TVWS. Hereafter, another exemplary embodiment of channel classification of the system for managing resources in a communication system in accordance with the exemplary embodiment of the present invention will be described in detail with reference to FIG. 6.

Figure 6:
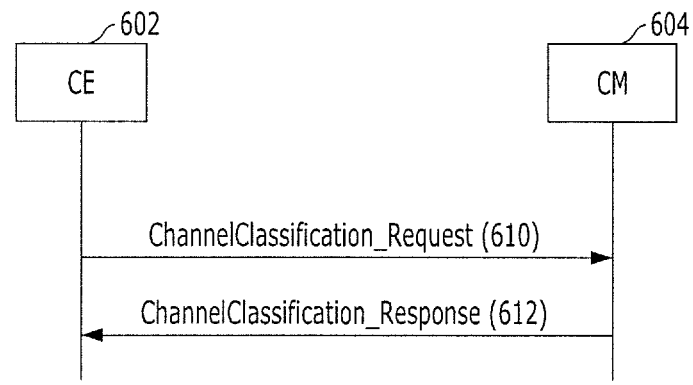

FIG. 6 is a diagram schematically showing another exemplary channel classification procedure of the system for managing resources in a communication system in accordance with the exemplary embodiment of the present invention. FIG. 6 is a diagram schematically showing another exemplary channel classification procedure by the CE of the system for managing resources in a communication system in accordance with the exemplary embodiment of the present invention.

Referring to FIG. 6, in order for channel classification for coexistence and frequency sharing in the TVWS, a CE 602 requests, to a CM 604 in which the CE 602 is registered, channel classification information of the CM 604 in the TVWS. That is to say, the CE 602 transmits a channel classification request (hereinafter, referred to as 'ChannelClassification_Request') message which requests the channel classification information of the CM 604, to the CM 604 (step 610).

Here, the ChannelClassification_Request message is a message which requests the channel classification information of the CM 604 in the TVWS with the CE 602 registered therein, for channel classification in the TVWS. The contents of the ChannelClassification_message, that is, the header and payload of the ChannelClassification_Request message may be presented as in Table 15.

TABLE 15

| Information element | Data type | Description |
|---|---|---|
| Header | | |
| sourceIdentifier = CE_ID or CDIS_ID | CX_ID | Source identifier |
| destinationIdentifier = CM_ID | CX_ID | Destination identifier |
| ACKPolicy | BOOLEAN | Request to send an acknowledgement of reception |
| Payload | | |
| listOfNetworkID | SEQUENCE OF NetworkID | Network ID list |

Also, the CE 602 receives a channel classification response (hereinafter, referred to as 'ChannelClassification_Response') message which includes the channel classification information of the CM 604, from the CM 604 as a response to the ChannelClassification_Request message (step 612).

The ChannelClassification_Response message as a response message of the ChannelClassification_Request message, which requests the channel classification information of the CM 604 in the TVWS by channel classification of the CM 604 in the TVWS, is a message through which the CM 604 provides the channel classification information of the CM 604 itself in the TVWS, to the CE 602. The contents of the ChannelClassification_Response message, that is, the header and payload of the ChannelClassification_Response message may be presented as in Table 16.

TABLE 16

| Information element | Data type | Description |
|---|---|---|
| Header | | |
| sourceIdentifier = CM_ID | CX_ID | Source identifier |
| destinationIdentifier = CE_ID or CDIS_ID | CX_ID | Destination identifier |
| ACKPolicy | BOOLEAN | Request to send an acknowledgement of reception |
| Payload | | |
| Note: Information elements below are repeated for each TVBD network or device. | | |
| networked | NetworkID | Network ID |
| chClassInfo | ChClassInfo | Channel classification information of the CE |

The CE 602, which has received the ChannelClassification_Response message including the channel classification information of the CM 604, from the CM 604 in this way, performs channel classification in the TVWS and channel classification update by using the channel classification information of the CM 604 in the TVWS. Hereafter, another exemplary embodiment of channel classification of the system for managing resources in a communication system in accordance with the exemplary embodiment of the present invention will be described in detail with reference to FIG. 7.

Figure 7:
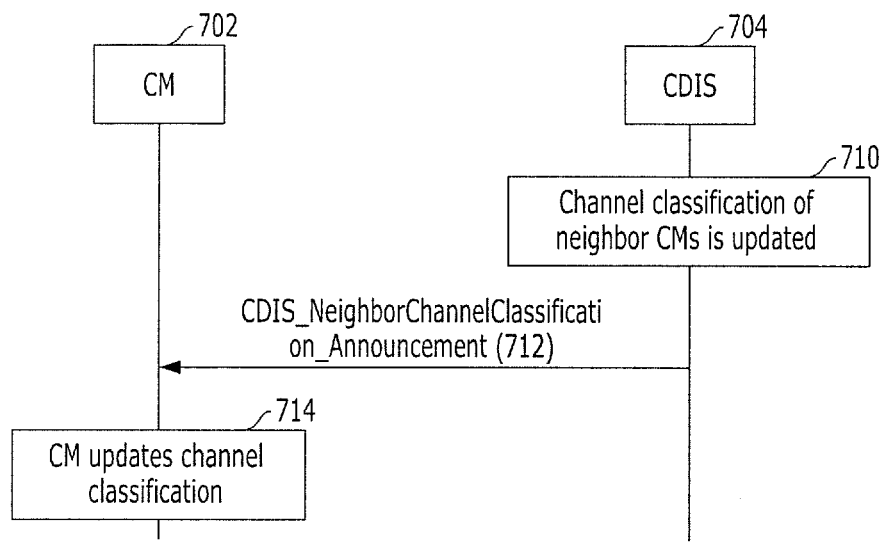

FIG. 7 is a diagram schematically showing another exemplary channel classification procedure of the system for managing resources in a communication system in accordance with the exemplary embodiment of the present invention. FIG. 7 is a diagram schematically showing another exemplary channel classification procedure by the CDIS of the system for managing resources in a communication system in accordance with the exemplary embodiment of the present invention.

Referring to FIG. 7, in order for channel classification for coexistence and frequency sharing in the TVWS, a CDIS 704 updates channel classification information of CMs neighboring to a CM 702 which is registered in the CDIS 704 (step 710). Thereafter, the CDIS 704 announces the channel classification information of the CMs neighboring to the corresponding CM 702, in particular, the channel classification information of the updated neighbor CMs, to the CM 702.

In other words, the CDIS 704 transmits to the CM 702 a CDIS neighbor channel classification announcement (hereinafter, referred to as 'CDIS_NeighborChannel Classification_Announcement') message which announces the channel classification information of the CMs neighboring to the CM 702, to the CM 702 (step 712).

Here, the CDIS_NeighborChannelClassification_Announcement message is a message which provides, to the optional CM 702 registered in the CDIS 704, the channel classification information of the CMs neighboring to the CM 702, and is transmitted to the corresponding CM 702 while including the channel classification information of the neighbor CMs updated by the CDIS 704 as described above. The contents of the CDIS_NeighborChannelClassification_Announcement message, that is, the header and payload of the CDIS_NeighborChannelClassification_Announcement message may be presented as in Table 17.

TABLE 17

| Information element | Data type | Description |
|---|---|---|
| Header | | |
| sourceIdentifier = CDIS_ID | CX_ID | Source identifier |

TABLE 17-continued

| | | |
|---|---|---|
| destinationIdentifier = CM_ID | CX_ID | Destination identifier |
| ACKPolicy | BOOLEAN | Request to send an acknowledgement of reception |
| Payload | | |
| Note: Information elements below are repeated for each neighbor CM. | | |
| neighborCMID | CX_ID | Neighbor CM ID |
| Note: Information elements below are repeated for each neighbor TVBD network or device. | | |
| neighborCEID | CX_ID | Neighbor CE ID |
| chClassInfo | ChClassInfo | Channel classification information of neighbor CE |

The CM 702, which has received the CDIS_NeighborChannelClassification_Announcement message including the channel classification information of the neighbor CMs, from the CDIS 704 in this way, updates channel classification in the TVWS by using the channel classification information of the neighbor CMs in the TVWS (step 714). Hereafter, another exemplary embodiment of channel classification of the system for managing resources in a communication system in accordance with the exemplary embodiment of the present invention will be described in detail with reference to FIG. 8.

Figure 8:
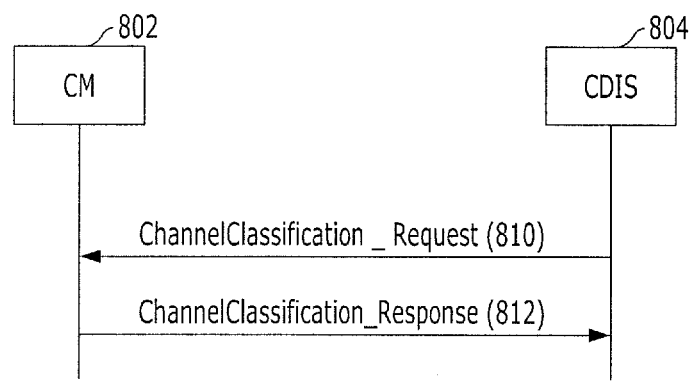

FIG. 8 is a diagram schematically showing another exemplary channel classification procedure of the system for managing resources in a communication system in accordance with the exemplary embodiment of the present invention. FIG. 8 is a diagram schematically showing another exemplary channel classification procedure by the CDIS of the system for managing resources in a communication system in accordance with the exemplary embodiment of the present invention.

Referring to FIG. 8, in order for channel classification for coexistence and frequency sharing in the TVWS, a CDIS 804 requests, to a CM 802 registered in the CDIS 804 itself, channel classification information of the CM 802 in the TVWS. Namely, the CDIS 804 transmits a channel classification request (hereinafter, referred to as 'ChannelClassification_Request') message which requests the channel classification information of the CM 802, to the CM 802 (step 810).

Here, the ChannelClassification_Request message is a message which requests the channel classification information of the CM 802 registered in the CDIS 804 in the TVWS, to the corresponding CM 802 for channel classification in the TVWS. The contents of the ChannelClassification_Request message, that is, the header and payload of the ChannelClassification_Request message may be presented as in Table 15.

The CDIS 804 receives a channel classification response (hereinafter, referred to as 'ChannelClassification_Response') message including the channel classification information of the CM 802, from the CM 802 as a response to the ChannelClassification_Request message (step 812).

Here, the ChannelClassification_Response message as a response message of the ChannelClassification_Request message, which requests the channel classification information of the CM 802 in the TVWS by the channel classification of the CM 802 in the TVWS, is a message through which the CM 802 provides the channel classification information of the CM 802 itself in the TVWS, to the CDIS 804. The contents of the ChannelClassification_Response message, that is, the header and payload of the ChannelClassification_Response message may be presented as in Table 16.

The CDIS 804, which has received the ChannelClassification_Response message including the channel classification information of the CM 802, from the CM 802 in this way, performs channel classification and channel classification update in the TVWS by using the channel classification information of the CM 802 in the TVWS. Hereafter, an exemplary embodiment of channel classification update of the system for managing resources in a communication system in accordance with the exemplary embodiment of the present invention will be described in detail with reference to FIG. 9.

Figure 9:
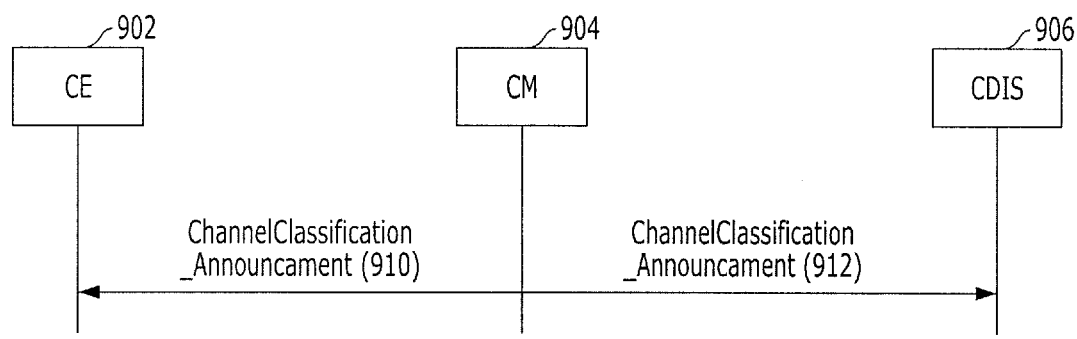
FIG. 9 is a diagram schematically showing a channel classification update procedure of a system for managing resources in a communication system in accordance with another exemplary embodiment of the present invention.

FIG. 9 is a diagram schematically showing a channel classification update procedure of the system for managing resources in a communication system in accordance with the exemplary embodiment of the present invention. FIG. 9 is a diagram schematically showing a channel classification update procedure by the CM of the system for managing resources in a communication system in accordance with the exemplary embodiment of the present invention.

Referring to FIG. 9, in order for channel classification for coexistence and frequency sharing in the TVWS, a CM 904 performs channel classification and channel classification update in the TVWS as described above, and provides channel classification information of the CM 904 itself in the TVWS, to a CE 902 which is registered in the CM 904 itself and a CDIS 906 in which the CM 904 itself is registered or to other optional CMs.

That is to say, the CM 904 transmits, to the CE 902 and the CDIS 906, a channel classification announcement (hereinafter, referred to as 'ChannelClassification_Announcement') message which announces the channel classification information of the CM 904 in the TVWS, to the CE 902 and the CDIS 906 (steps 910 and 912). In order to announce the channel classification information of the CM 904 in the TVWS to the other CMs, the CM 904 may transmit the ChannelClassification_Announcement message to the other CMs.

Here, the ChannelClassification_Announcement message, as a message which provides the channel classification information of the CM 904 in the TVWS, to the CE 902 registered in the optional CM 904 and the CDIS 906 with the CM 904 registered therein, is transmitted to the CE 902 and the CDIS 906 while including the channel classification information of the CM 904 for which channel classification and channel classification update have been performed by the CM 904. Further, the ChannelClassification_Announcement message may be transmitted to other CMs. The contents of the ChannelClassification_Announcement message, that is, the header and payload of the ChannelClassification_Announcement message may be presented as in Table 18.

TABLE 18

| Information element | Data type | Description |
|---|---|---|
| Header | | |
| sourceIdentifier = CM_ID | CX_ID | Source identifier |
| destinationIdentifier = CM_ID or CE_ID | CX_ID | Destination identifier |
| ACKPolicy | BOOLEAN | Request to send an acknowledgement of reception |
| Payload | | |
| Note: Information elements below are repeated for each TVBD network or device. | | |
| Networked | NetworkID | Network ID |
| chClassInfo | ChClassInfo | Channel classification information of the CE |

The CE 902 and the CDIS 906, which have received the ChannelClassification_Announcement message including the channel classification information of the CM 904, from the CM 904 in this way, performs channel classification update in the TVWS by using the channel classification information of the CM 904 in the TVWS.

As described above, in order for coexistence and frequency sharing in a TVWS, the system for managing resources in a communication system in accordance with the exemplary embodiment of the present invention classifies channels in the TVWS and determines channels available in the TVWS, as operating channels, thereby supporting coexistence and frequency sharing among a plurality of systems, that is, TVBDs, in the TVWS.

As is apparent from the above descriptions, in accordance with the embodiments of the present invention, frequency resources are managed such that a plurality of systems can use available frequency bands among frequency bands used in advance like a TV band through coexistence and frequency sharing in a communication system, thereby allowing efficient use of limited frequency resources and improving frequency resource utilization efficiency.

While the present invention has been described with respect to the specific embodiments, it will be apparent to those skilled in the art that various changes and modifications may be made without departing from the spirit and scope of the invention as defined in the following claims.

What is claimed is:

1. A system for managing resources in a communication system including a plurality of systems which do not have a permission for a first frequency band, the system comprising:
   a coexistence manager configured to, when a frequency band available for the plurality of systems is searched from the first frequency band, manage the plurality of systems for coexistence and frequency sharing of the plurality of systems in the available frequency band;
   a coexistence enabler configured to transmit and receive information of the plurality of systems and information of the coexistence manager; and
   a coexistence discovery and information server configured to support control of the coexistence manager over the plurality of systems,
   wherein a plurality of coexistence managers are provided to respectively correspond to the plurality of systems, and
   wherein the coexistence managers transmit and receive predetermined messages to and from the coexistence discovery and information server and the coexistence enabler, perform channel classification for the first frequency band, and determine operating channels of the plurality of systems on the basis of the channel classification.

2. The system of claim 1, wherein each of the predetermined messages includes a header, a payload and a data type.

3. The system of claim 2, further comprising:
   a TVWS DB configured to provide channel information of available frequency band by using the predetermined messages.

4. The system of claim 3, wherein the coexistence managers transmit request messages which request channel classification information of the coexistence managers from the channel information, to the TVWS DB, and receive response messages including the channel classification information, from the TVWS DB as responses to the request messages, thereby performing the channel classification for the first frequency band.

5. The system of claim 3, wherein the coexistence managers transmit request messages which request lists of channels available for the coexistence managers from the channel information, to the TVWS DB, and receive response messages including the available channel lists, from the TVWS DB as responses to the request messages, thereby performing the channel classification for the first frequency band.

6. The system of claim 3, wherein the coexistence managers receive the channel information from the TVWS DB, and perform the channel classification for the first frequency band with respect to all coexistence enablers registered in the coexistence managers, by using the channel information.

7. The system of claim 2, wherein a first coexistence manager of the coexistence managers transmits a request message which requests channel classification information of coexistence managers neighboring to the first coexistence manager, to the coexistence discovery and information server, and receives a response message including the channel classification information, from the coexistence discovery and information server as a response to the request message, thereby performing the channel classification for the first frequency band.

8. The system of claim 2, wherein a first coexistence manager of the coexistence managers transmits request messages which request channel classification information of coexistence managers neighboring to the first coexistence manager, to the neighbor coexistence managers, and receives response messages including the channel classification information, from the neighbor coexistence managers as responses to the request messages, thereby performing the channel classification for the first frequency band.

9. The system of claim 2, wherein a first coexistence manager of the coexistence managers transmits a request message which requests channel classification information of a second coexistence manager, to the second coexistence manager, and receives a response message including the channel classification information, from the second coexistence manager as a response to the request message, thereby performing the channel classification for the first frequency band.

10. The system of claim 2, wherein the coexistence enabler transmits a request message which requests channel classification information of a first coexistence manager among the coexistence managers in which the coexistence enabler is registered, to the first coexistence manager, and receives a response message including the channel classification information, from the first coexistence manager as a response to the request message, thereby performing the channel classification for the first frequency band.

11. The system of claim 2, wherein a first coexistence manager of the coexistence managers receives an announcement message which announces channel classification information of coexistence managers neighboring to the first coexistence manager, from the coexistence discovery and information server, thereby performing the channel classification for the first frequency band.

12. The system of claim 11, wherein the coexistence discovery and information server updates the channel classification information of the neighbor coexistence managers, and announces the updated channel classification information to the first coexistence manager by using the announcement message.

13. The system of claim 2, wherein the coexistence discovery and information server transmits a request message which requests channel classification information of a first coexistence manager among the coexistence managers which is registered in the coexistence discovery and information server, to the first coexistence manager, and receives a response message including the channel classification information, from the first coexistence manager as a response to the request message, thereby performing the channel classification for the first frequency band.

14. The system of claim 2, wherein a first coexistence manager of the coexistence managers updates channel classification information of the first coexistence manager, and announces the updated channel classification information to the coexistence discovery and information server, the coexistence enabler and a second coexistence manager of the coexistence managers by using an announcement message.

15. The system of claim 2, wherein the coexistence managers classify the first frequency band into operating channels, coexistent channels, available channels, protected channels, restricted channels, disallowed channels, allowed channels and unclassified channels, through the channel classification.

16. A method for managing resources of a first frequency band in a communication system including a plurality of systems which do not have a permission for the first frequency band, the method comprising:
obtaining, when a frequency band available for the plurality of systems is searched from the first frequency band, channel classification information of a plurality of coexistence managers which are configured to manage the plurality of systems in the available frequency band, from a TVWS DB which provides channel information of the available frequency band, for coexistence and frequency sharing of the plurality of systems in the available frequency band;
updating channel classification of the first frequency band on the basis of the channel classification information; and
determining operating channels of the plurality of systems from the channel classification of the first frequency band.

17. The method of claim 16, wherein said obtaining the channel classification information transmits request messages which request available channel lists of the coexistence managers, to the TVWS DB, and receives response messages including the available channel lists, from the TVWS DB as responses to the request messages.

18. The method of claim 16, wherein said obtaining the channel classification information transmits request messages which request channel classification information of coexistence managers neighboring to a first coexistence manager among the coexistence managers, to the neighbor coexistence managers, and receives response messages including the channel classification information, from the neighbor coexistence managers as responses to the request messages.

19. The method of claim 16, further comprising:
announcing channel classification information for the updated channel classification of the first frequency band, to the plurality of coexistence managers, a coexistence discovery and information server which supports control of the coexistence managers over the plurality of systems, and coexistence enablers which are registered in the plurality of coexistence managers.

20. The method of claim 16, wherein, through the channel classification, the first frequency band is classified into operating channels, coexistent channels, available channels, protected channels, restricted channels, disallowed channels, allowed channels and unclassified channels.

* * * * *